(12) United States Patent
Readio et al.

(10) Patent No.: US 6,874,693 B2
(45) Date of Patent: Apr. 5, 2005

(54) METHOD AND APPARATUS FOR CONTROLLING A MULTI-SOURCE HEATING SYSTEM

(75) Inventors: Philip O. Readio, Savage, MN (US); Paul G. Schwendinger, St. Louis Park, MN (US); Andrew J. Hulse, Elk River, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/327,444

(22) Filed: Dec. 20, 2002

(65) Prior Publication Data

US 2004/0118933 A1 Jun. 24, 2004

(51) Int. Cl.⁷ .............................................. G05D 23/00
(52) U.S. Cl. ...................... 237/2 B; 237/2 A
(58) Field of Search ................. 237/2 B, 2 A; 62/238.1, 238.2, 238.3, 238.4, 238.5, 238.6, 238.7

(56) References Cited

U.S. PATENT DOCUMENTS

| | | | |
|---|---|---|---|
| 3,996,998 A | | 12/1976 | Garst et al. |
| 4,066,118 A | * | 1/1978 | Goettl .......................... 165/236 |
| 4,124,177 A | * | 11/1978 | Timmerman ................ 237/2 B |
| 4,232,531 A | | 11/1980 | Mangam, Jr. et al. |
| 4,266,599 A | * | 5/1981 | Saunders et al. ........... 165/239 |
| 4,298,056 A | | 11/1981 | Nelson |
| 4,353,409 A | * | 10/1982 | Saunders et al. ........... 165/240 |
| 4,445,567 A | | 5/1984 | Nelson |
| 4,598,764 A | | 7/1986 | Beckey |
| 4,627,483 A | * | 12/1986 | Harshbarger et al. ....... 237/2 A |
| 4,703,795 A | | 11/1987 | Beckey |
| 4,860,552 A | | 8/1989 | Beckey |
| 4,910,966 A | | 3/1990 | Levine et al. |
| 5,309,730 A | | 5/1994 | Strand et al. |
| 5,352,930 A | | 10/1994 | Ratz |
| 5,367,601 A | * | 11/1994 | Hannabery ................... 392/307 |
| 5,704,545 A | * | 1/1998 | Sweitzer, Jr. ................ 237/8 R |
| 6,109,533 A | * | 8/2000 | Ao et al. ..................... 237/2 B |
| 6,401,468 B1 | * | 6/2002 | Hoyle et al. .................. 62/175 |

OTHER PUBLICATIONS

TZ–3 TotalZone® Zone Control Panel, Product Data Sheets, pp. 1–16, Honeywell, Copyright 2001.
TZ–4 TotalZone® Zone Control Panel, Product Data Sheets, pp. 1–20, Honeywell, Copyright 2002.
Installer's Guide, Add–On heat Pump Kit, Model TAYPLUS103A, American Standard, Inc., 4 pages, 1996.
Bill Porter, Bill Porter's BPC–1 Dual Fuel™ Control, 2 pages, 1999.

* cited by examiner

Primary Examiner—Derek S. Boles
(74) Attorney, Agent, or Firm—Gregory M. Ansems (57) ABSTRACT

The present invention is directed at methods and apparatus for controlling multi-source heating systems. The multi-source heating systems of the present invention may include two or more heat sources such as a heat pump, a furnace, an electric heating strip, or any other suitable heat source. An illustrative system includes a multi-zone, multi-source heating system. The illustrative system may determine which of the multiple sources to use depending on a number of factors. Some illustrative factors include information about zones calling for heat, external environment information, and information about the heat sources. One of the heat sources may be, for example, a heat pump, and a determination of whether to activate the heat pump may include determining the current heating capacity of the heat pump and comparing the heating capacity to the amount of heat needed to satisfy the current heat calls. Methods for determining which of at least two heat sources to use are also provided. Additional embodiments include methods for controlling multiple-source heating systems, and systems for providing heat with multiple sources.

26 Claims, 6 Drawing Sheets

FIG. 1

| Condition (110) | Zone 1 (111) | Zone 2 (112) | Exterior (113) | Heat Pump (114) | Electric Strip (115) | Furnace (116) | Heat Pump Timer (117) | Blower (118) |
|---|---|---|---|---|---|---|---|---|
| Off | | >T1 | >Cutoff | Off | Off | Off | n.a. | Off |
| 1 | <T1; >T2 | >T1 | >Cutoff | On | Off | Off | <20 min | Low |
| 1 | >T1 | <T1, >T2 | >Cutoff | On | Off | Off | <20 min | Low |
| 2 | Both Zones <T1; >T2 | | >Cutoff | On | On | Off | <20 min | High |
| 3 | Any Call | | >Cutoff | Disabled | Off | On | >20 min | High |
| 4 | <T2 | >T1 | >Cutoff | Off | Off | On | n.a. | Low |
| 4 | >T1 | <T2 | >Cutoff | Off | Off | On | n.a. | Low |
| 5 | Only One Zone Calling | | <Cutoff | Disabled | Off | On | n.a. | Low |
| 6 | Both zones <T1, >T2 | | <Cutoff | Disabled | Off | On | n.a. | High |
| 7 | <T2 | <T1; >T2 | n.a. | Off | Off | On | n.a. | High |
| 7 | <T1; >T2 | <T2 | n.a. | Off | Off | On | n.a. | High |
| 8 | <T2 | <T2 | n.a. | Off | On | On | n.a. | High |

Define T1 = 68 degrees — 100
T2 = 66 degrees — 102
Cutoff = 15 degrees — 104

| Load Score | Zone 1 | Zone 2 | Zone 3 | Zone 4 | Heat Need | Outside Temp | Heat Pump Capacity | Heat Pump or Furnace? |
|---|---|---|---|---|---|---|---|---|
| | 4 | 6 | 3 | 8 | | | | |
| Condition 1 | Call | Call | Call | | 9 | 35 | 9 | Heat Pump |
| Condition 2 | Call | | Call | Call | 15 | 35 | 9 | Furnace |
| Condition 3 | | | Call | Call | 8 | 30 | 9 | Heat Pump |
| Condition 4 | Call | | Call | Call | 11 | 30 | 9 | Furnace |
| Condition 5 | | Call | | | 7 | 25 | 8 | Heat Pump |
| Condition 6 | Call | | Call | Call | 14 | 25 | 8 | Furnace |
| Condition 7 | | Call | | | 3 | 13 | 5 | Heat Pump |
| Condition 8 | | | | | 4 | 13 | 5 | Furnace |
| Condition 9 | Call | Call | | | 6 | 13 | 5 | Furnace |
| Condition 10 | Call | | | | 4 | 5 | 0 | Furnace |
| Condition 11 | Call | Call | Call | | 13 | 45 | 9 | Furnace |
| Condition 12 | Call | Call | Call | | 13 | 50 | 18 | Heat Pump |
| Condition 13 | Call | Call | Call | Call | 21 | 50 | 18 | Furnace |

Note: Heat pump diminished capacity threshold is 28 degrees
Note: Heat pump versus furnace efficiency threshold is 15 degrees
Note: Heat Pump does not function below 8 degrees
Note: Heat Pump strong preference above 48 degrees

METHOD AND APPARATUS FOR CONTROLLING A MULTI-SOURCE HEATING SYSTEM

BACKGROUND

The invention relates generally to heating systems, and more specifically, to multi-source heating systems.

A relatively recent innovation in heating systems has been the introduction of multi-source heating systems. Several such systems use a heat pump as a primary heating source. Auxiliary sources are then provided to add heat during times when the heat pump does not function efficiently. Some typical auxiliary sources include fossil fuel furnaces (i.e. fuel oil, propane or natural gas furnaces, for example), electric heating strips, as well as other heat sources.

As is known, heat pumps may be used to heat an interior space by transporting heat from an exterior environment to an interior space. Air-to-air heat pumps operate to transport heat contained in outside air to warm the interior space. Water-to-air heat pumps operate to transport heat from water (for example groundwater or a nearby pond or other water source) to warm an interior space. Ground source heat pumps operate to transport heat from the ground to an interior space. In each system, heat transfer is typically achieved by control of a liquid/gas state change of a refrigerant.

In many cases, the phase change from a liquid to a gas is induced in the refrigerant in an evaporator. The gaseous refrigerant passes through an external heat exchanger, picking up heat from the external air, water or ground, depending on the type of heat pump. The gaseous refrigerant is then compressed into a higher temperature liquid in a compressor. The hot liquid refrigerant is then passed through an internal heat exchanger. Air in a ventilation system is forced over the internal heat exchanger and absorbs heat from the heated liquid refrigerant. The cooler liquid refrigerant then returns to the evaporator and is recycled back through the system.

The net result of this cycle is the transportation of heat from the colder exterior medium to warm the interior air. The amount of electrical energy required to transport this heat (the electrical power consumption of the compressor and the interior and exterior fans) is generally less than the electrical energy equivalent of the transported heat. Thus, a heat pump, when operating at or near optimal conditions can often provide more efficient heating than an electric resistance heater, for example, using the same amount of electrical power.

The efficiency of a heat pump typically degrades as the outside temperature falls. In some cases, the external heat exchanger for an air-to-air heat pump (which is a common type of heat pump) cannot sufficiently "warm" the refrigerant if the outside air temperature is too low. For example, in some cases, the cold liquid entering the external heat exchanger may be on the order of 0 degrees Fahrenheit. If the outside air temperature is below 0 degrees Fahrenheit, heat absorption by the refrigerant will be minimal at best. As can be seen, the efficiency of an air-to-air heat type pump may go down with outside temperature. In some cases, frost can even develop on an external heat exchanger, creating additional difficulty by slowing heat exchange and potentially damaging the equipment.

Because of these and other shortcomings of heat pumps, some heating systems use an auxiliary heat source to provide heat when the heat pump is not functioning efficiently. The auxiliary heat source may be activated when, for example, the heat pump no longer has the capacity to heat the inside space. In many cases, the auxiliary heat source may have a greater heat producing capacity than the heat pump, but typically cost more to operate.

In some cases, an auxiliary heat source is added or retrofitted to an existing heating system. Typically, the auxiliary heat source is included with an auxiliary control kit that receives an on/off signal or the like from the controller of the existing heating system. In some cases, the controller of the existing heating system can provide calls for two or more stages of heating. The inclusion of the auxiliary control kit, however, adds expense to the system. In addition, the auxiliary control kit may itself include internal controls that prevent the controller of the existing system from fully controlling the auxiliary heat source.

SUMMARY

The present invention is directed at methods and apparatus for controlling multi-source heating systems. The multi-source heating systems of the present invention may include two or more heat sources such as a heat pump with one or more heat stages, a fossil fuel furnace, an electric heating strip, or any other suitable heat source.

In one illustrative embodiment of the present invention, a heat pump and an auxiliary heating source are both provided. A temperature sensor is positioned at or upstream of the heat pump source in the ventilation system of the heating system. An integrated multi-source controller is also provided. To help protect the heat pump source from overheating, the integrated multi-source controller may be adapted to deactivate the heat pump source when the air temperature sensed by the temperature sensor is above a predetermined temperature threshold value. The multi-source controller may be adapted to control a single or multi-zone heating system.

An outdoor temperature sensor may also be provided. The integrated multi-source controller may be adapted to activate the heat pump source if the outdoor temperature sensor indicates that the outdoor air temperature is above a predetermined temperature threshold, and deactivate the heat pump source if the outdoor temperature sensor indicates that the outdoor air temperature is below a predetermined temperature threshold.

Rather than simply deactivating the heat pump when the outside air temperature reaches a predetermined temperature threshold value, the present invention contemplates continuing to use the heat pump to satisfy heat calls that correspond to less than the entire heated space. As noted above, the heating capacity of a heat pump may tend to degrade as the outside air temperature decreases. However, even at a reduced capacity, the heat pump may still have sufficient heating capacity to heat less than the entire space or enclosure. Thus, in a multi-zone system for example, the heat pump source may be efficiently used when less than all of the zones are calling for heat.

In accordance therewith, it is contemplated that the controller of the present invention may be adapted to determine whether the heat pump source is capable of providing sufficient heat to satisfy the expected heating load of the zone(s) that are currently calling for heat. If so, the controller may activate the heat pump source to satisfy the call for heat. If not, the controller may activate an auxiliary heat source, sometimes in combination with the heat pump, to satisfy the call for heat. This may provide a more efficient system.

To help determine whether the heat pump source is capable of providing sufficient heat to satisfy the expected heating load of the zone(s) that are currently calling for heat, reference may be made to information relating to an estimated heating load of each of the zones and information relating to an estimated heating capacity of the heat pump source. The estimated heating load of the zone(s) that are currently calling for heat as well as the estimated heating capacity of the heat pump source may depend on the outdoor air temperature and/or the outdoor air humidity.

In some cases, it may be desirable to directly measure the heat output of the current configuration of heat sources. To accomplish this, a downstream air temperature sensor may be provided downstream of all of the heat sources. This sensor may be used to determine if the current configuration of heat sources is actually providing sufficiently heated air to satisfy the current call for heat. In some embodiments, a pressure sensor may also be provided to provide a measure of air speed or volume passing through the ventilation system. If the current configuration of heat sources is not providing sufficiently heated air to satisfy the current call for heat, the controller may activate an auxiliary heat source as desired.

By measuring the current heat output of the current configuration of heat sources, a correlation to an expected heating duty cycle may also be determined. Under some conditions, it may be desirable to adjust the current configuration of heat sources to achieve a desired heating duty cycle. For example, when the controller is programmed to reduce the temperature of a building or parts of a building during certain periods of time (often called a temperature set back period), a shorter heating duty cycle may be desired in order to maximize energy savings. A shorter heating duty cycle often requires an increased heat output from the current configuration of heat sources. In a multi-zone heating system, each zone or group of zones may have the same or different heating duty cycle, as desired.

Figure 1:
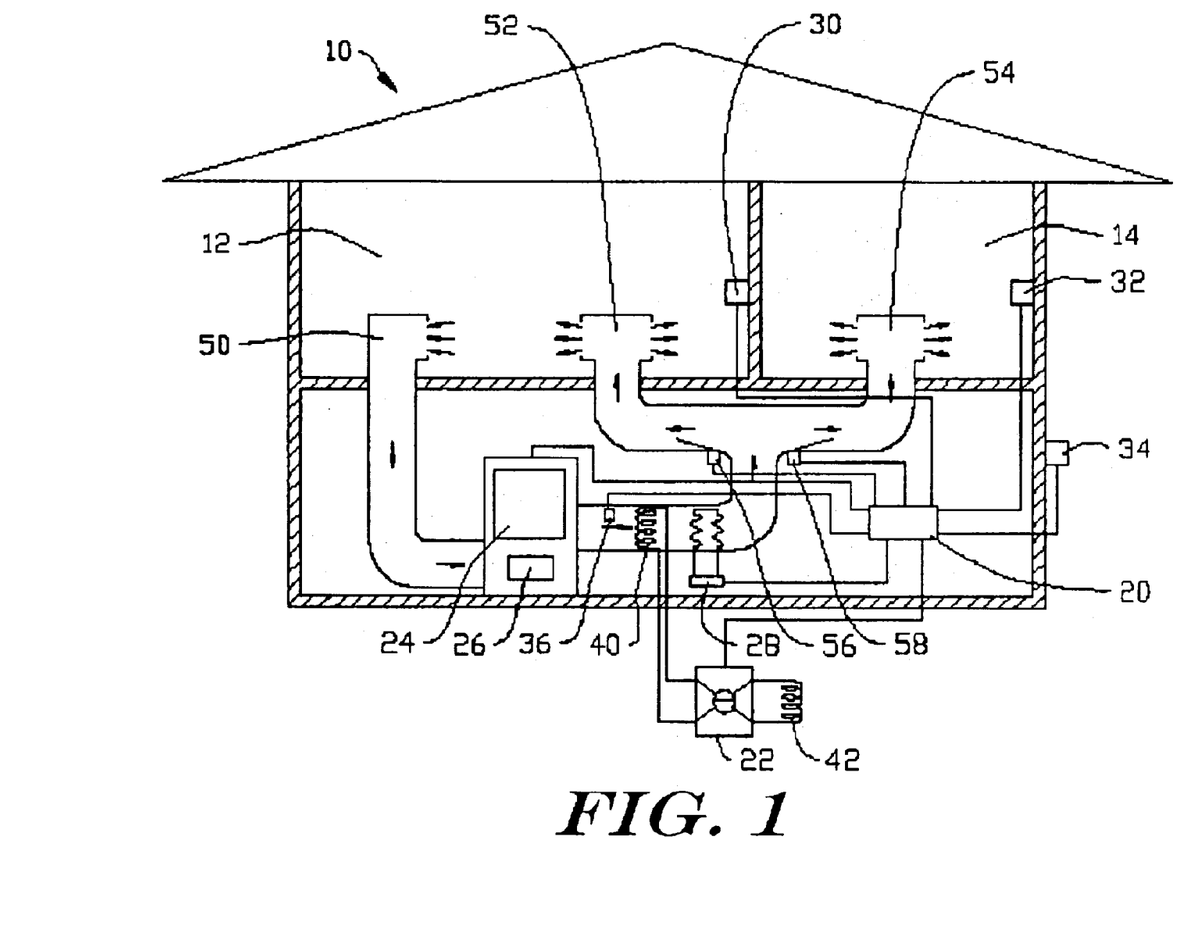
FIG. 1 shows a highly diagrammatic schematic view of a zoned multi-source heating system.

In one example, the controller may determine a heating duty cycle or expected heating duty cycle for selected zone(s) and/or groups of zones when only a first heat source is activated. The controller may then activate only a first heat source when the heating duty cycle or expected heating duty cycle is below a predetermined duty cycle set point, and activate a second heat source alone or in combination with the first heat source when the heating duty cycle or expected heating duty cycle is above the predetermined duty cycle set point. In this way, a desired heating duty cycle can be achieved. enclosure. In some embodiments, the controller 20 may be part of a modular control system, whereby a main controller module is provided along with a number of zone control modules. The main controller module preferably contains the main control function for the multi-zone multi-source heating system, while each zone control module controls the position of the dampers in a particular zone, and possibly receives a signal from a corresponding thermostat and passes the information to the main controller module. An advantage of a modular approach is that only enough zone control modules need to be provided to accommodate the number of zones defined for the structure.

In the illustrative embodiment, the controller 20 gathers information about temperatures in the structure from a first thermostat 30 in the first zone 12 and a second thermostat 32 in the second zone 14, and also gathers data from an external air sensor 34. In some embodiments, the external air sensor 34 may be a temperature sensor, while in other embodiments the external air sensor 34 may sense other external conditions including, for example, humidity. The controller 20 may include any suitable device or devices for controlling the system, including, for example, a microcontroller, computer, logic assembly, programmable logic array, or any of a variety of simpler or more complex electronic or other devices.

The external air sensor 34 may be used to disable the heat pump 22 at low temperatures, triggering heat by the furnace 24 and/or strip heat 28. The external air sensor 34 may also be used to estimate the heating capacity of the heat pump 22, and/or to estimate the heating load of the first zone 12 and the second zone 14. For example, if the first zone 12 includes several drafty windows or doors, while the second zone 14 does not, the anticipated heat load of the first zone 12 may vary more with outdoor air temperature, while the anticipated heat load of the second zone 14 may vary less with outdoor air temperature.

In other embodiments, the external air sensor 34 may sense humidity. The amount of humidity in the external environment, in particular when using an air-to-air heat pump 22, can affect the efficiency and output of the heat pump 22. For example, in humid environments, particularly at low temperatures, the external heat exchanger can experience frost buildup during operation. This is because, in many embodiments, the external heat exchanger receives gaseous refrigerant that is below the freezing

DETAILED DESCRIPTION

FIG. 1 shows a highly diagrammatic structure adapted for environmental control by a zoned multi-source heating system. While the present invention is not limited to multi-zoned systems, a multi-zoned system is used for illustration. The system shown in FIG. 1 is used to control the temperature in an enclosure 10 in which a first zone 12 and a second zone 14 have been defined. The illustrative system includes a controller 20 which controls a heat pump 22, a furnace 24, and a blower 26 along with a heat strip 28 which may be included as a third heat source. Though a furnace 24 is shown as an auxiliary heat source, any suitable heat source may be included as an auxiliary heat source. Some suitable auxiliary heat sources include natural gas, propane, fuel oil or other fossil fuel furnaces, wood, pellet or other burning sources, boilers, or a variety of electric sources including, for example, electric heat strips. The auxiliary heat source may also be one or more auxiliary stages of a multi-stage heat pump, if desired.

The controller 20 is preferably an integrated controller that includes a single PC board or small number of PC boards. The controller 20 also preferably is included in a single enclosure or housing that can be easily mounted to a wall or the like in the temperature for water. This can cause condensation and, if the heat pump 22 operates long enough, can lead to frost and/or ice build up. Not only can such build up damage the external heat exchanger, it can also interfere with the heat exchange by insulating the heat exchanger. This build up, in turn, can reduce the efficiency of the heat pump 22. The humidity, therefore, can be a consideration in determining when and for how long the heat pump 22 should be operated.

In some embodiments, the external air sensor 34 may provide temperature information that the controller 20 may use to determine how efficiently the heat pump 22 is operating. For example, some heat pumps 22 are designed and tested to create an efficiency curve that relates heat pump efficiency to external temperature. These curves may also include information that can be used for controlling the operation of heat pump 22 such as, for example, compressor speed and/or duty cycle of the heat pump 22. The controller 20 may use these curves (or may include information related to or approximating these curves) to determine the maximum heat output of the heat pump 22 at a given outside air temperature. The information may also be used by the controller 20 to control the elements of the heat pump 22 including, for example, auxiliary stages of a multi-stage heat pump, compressor speed and/or initiating a defrost cycle where the heat pump 22 operates in reverse to heat the external heat exchanger to melt off built-up frost.

The controller 20 may also capture information from a return air sensor 36, which in the illustrative embodiment, determines the temperature of air in the ventilation system at or just before the heat pump exchange coil 40. If the air temperature in the ventilation system is too high, it can cause damage to the compressor or other elements of the heat pump 22 if the heat pump 22 is activated. The return air sensor 36 may therefore be used to determine whether the heat pump 22 should be disabled if, for example, the furnace 24 is operating or has just recently been turned off but is still heating the air.

Also illustrated is an air intake 50, which is only shown in the first zone 12, though a second air intake could also be included in the second zone 14. A first vent 52 feeds air into the first zone 12, and a second vent 54 feeds air into the second zone 14. A first damper 56 controls whether air is forced through the first vent 52 into the first zone 12, while a second damper 58 controls whether air is forced through the second vent 54 into the second zone 14.

During operation of the illustrative zoned multi-source system shown in FIG. 1, the controller 20 may sense whether either thermostat 30 and/or 32 indicates a call for heat in either respective zone 12 and/or 14. If there is a call for heat, the controller 20 may activate the blower 26, and selectively open whichever dampers 56 and/or 58 correspond to the calling zone(s). The controller 20 may then activate the heat pump 22 if the external air sensor 34 and return air sensor 36 indicate proper operating conditions exist. Otherwise, the controller 20 may activate the furnace 24 and/or strip heat 28 in the illustrative embodiment.

In some embodiments, the controller 20 may include a heat pump timer for determining how long the heat pump 22 has been operating in response to a call for heat. In such embodiments, the controller 20 may turn off the heat pump 22 if the heat pump 22 fails to satisfy the call for heat within a predetermined amount of time. The time limit of operation of the heat pump 22 may be based upon concerns about inhabitant comfort in the enclosure 10. A time limit may also be based upon concerns about the mechanics of the heat pump 22, for example, the compressor may need to be turned off after running for a certain amount of time. Also, the time limit may reflect considerations of frost build up on the exterior heat exchanger of the heat pump 22, which is a target for frost in high humidity, relatively low temperature environments. Other considerations may also be used to determine a time limit for heat pump 22 operation, including a desired heating duty cycle as further described below.

Whether the controller 20 activates the heat pump 22, the strip heat 28 and/or the furnace 24 may depend on whether the call for heat is a first stage heat call, a second stage heat call, or a third stage heat call. For example, a first stage heat call may occur when only one zone 12 or 14 calls for heat, and/or when neither zone 12 or 14 has a temperature below a second-stage heating temperature. A second stage heat call may occur after a thermostat indicates a temperature that is below a second-stage heating temperature such as 68 degrees, and a third stage heat call may occur if a thermostat indicates a temperature below a third-stage heating temperature such as 66 degrees.

Figure 2:
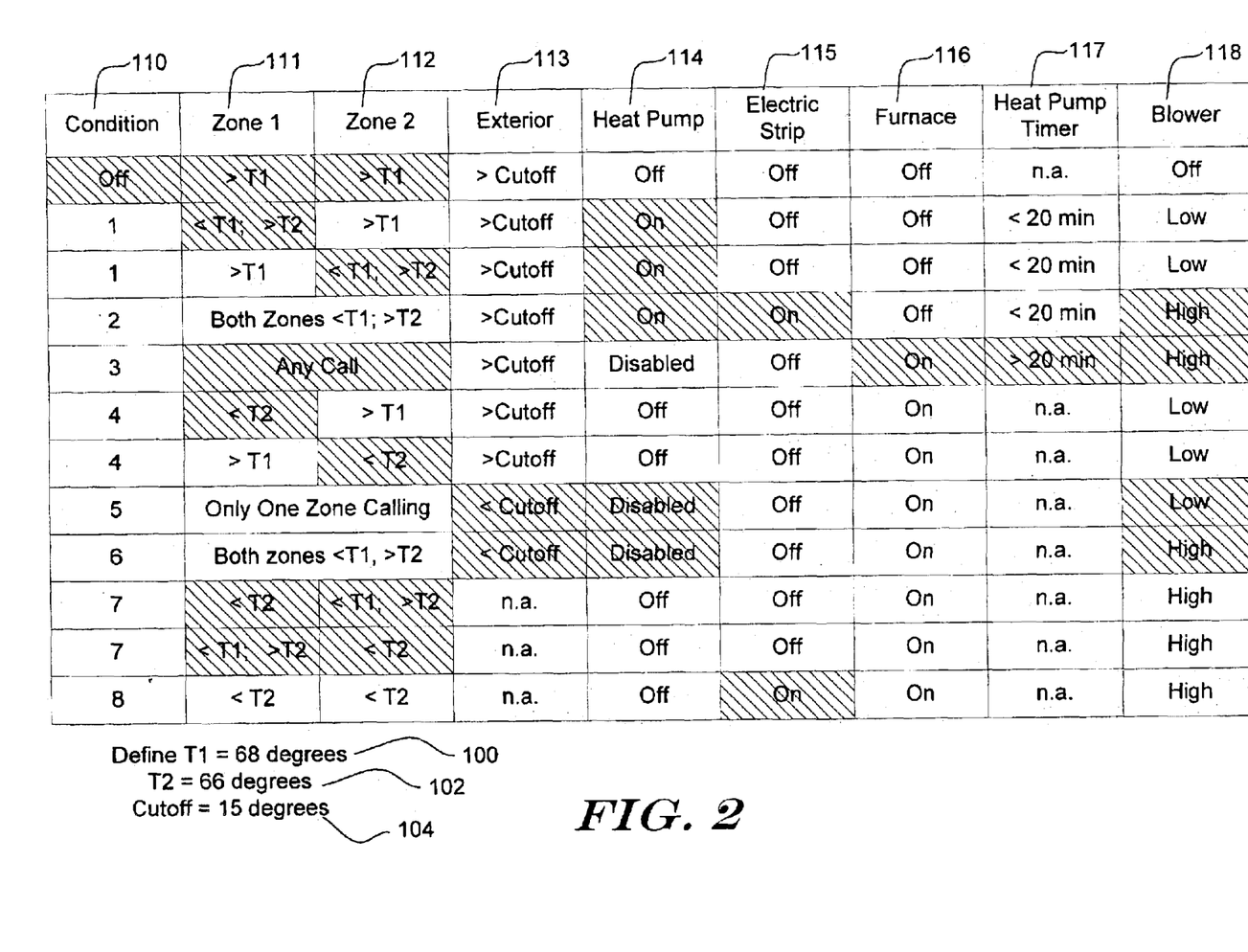
FIG. 2 is a table illustrating several heating stages for an illustrative zoned multi-source heating system in accordance with the present invention.

An illustrative collection of heating conditions is shown in the table of FIG. 2. Certain cells are highlighted by cross-hatching to assist in understanding the most relevant states and decisions for each condition. The conditions illustrated are not intended as limiting and do not provide an exhaustive list of conditions. For the illustrative diagram of FIG. 2, a first condition occurs when only one zone 111 or 112 senses a temperature that is below a first threshold temperature 100 but above a second threshold temperature 102, and when the exterior temperature 113 is above a cutoff temperature 104. The first condition calls for activation of the heat pump 114 and the blower 118, with the blower set to low.

A second condition occurs when both zones 111 and 112 sense a temperature below the first threshold 100 but above a second threshold 102, in which case the heat pump 114 and electric strip heat 115 are activated and the blower 118 is set to high. The blower 118 may be set to high because more air may need to be forced into the space because two zones are calling for heat rather than just one. A third condition may occur if the heat pump 114 and the electric strip heat 115 fail to satisfy the heating call within a predetermined time period, which may be monitored by a heat pump or other timer 117. In the third condition, the furnace 116 may be activated to satisfy the heating call.

A fourth condition may arise when, for example, one of the zones 111 or 112 is calling for heat but the calling zone senses a temperature below both the upper threshold 100 and the lower threshold 102. In the fourth condition, the blower 118 is set to low and the furnace 116 is activated, and the heat pump 114 is turned off.

A fifth condition may arise when the exterior temperature 113 is below a cutoff temperature 104. When the exterior temperature 113 is below the cutoff temperature 104, the heat pump 114 may be too inefficient to be effectively used. In this condition, the heat pump 114 may be disabled and the furnace 116 may be used to respond to a call by one of zone 111 or 112, and the blower 118 is set to low.

The sixth illustrative condition may occur when both zones 111 and 112 are calling for heat, and the sensed temperature in both zones is above the second threshold 102 but below the first threshold 100. The sixth condition also assumes that the heat pump 114 is disabled due to an exterior temperature 113 that is below the cutoff temperature 104. In the sixth condition, the furnace 116 may provide heat and the blower 118 may be set to high. In other embodiments, the heat pump 114 may be disabled by sensing an air temperature sensor within the ventilation system and/or other mechanisms, including a manual switch, if desired.

A seventh condition occurs when one of the zones 111 or 112 senses a temperature below the second threshold 102 and the other zone senses a temperature between the first and second thresholds 100, 102. In the seventh condition, the blower 118 is set on high, and the furnace 116 is activated. An eighth condition occurs when both zones 111 and 112 sense temperatures below the second threshold 102. In the eighth condition, both the furnace 116 and the electric strip heat 117 may be activated, with the blower 118 set on high. It should be recognized that the conditions shown and described in FIG. 2 are merely illustrative of a variety of manipulations that may be undertaken in a multi-zone, multi-source heating system having a controller as described herein, and are not intended to be an exhaustive list.

The illustrative conditions in FIG. 2 also show several additional aspects of the present invention. For example, the second condition uses two heat sources at the same time. This condition may be incorporated into a system such as those illustrated below in FIGS. 6 and 7, for example, which include additional temperature sensors placed and adapted to control the use of a heat pump in conjunction with a heat strip. The extra sensors in FIGS. 6 and 7 may be used to, for example, modulate an electric strip or furnace during the second condition operation of FIG. 2, if desired.

In some zoned systems, a multi-speed blower may be provided to vary the amount of air that is forced through the system depending on the number of calling zones. For example, the blower 26 may have two speeds and use a lower speed when only one zone is calling for heat, and a higher speed when two or more zones are calling for heat. Also, as a safety precaution, the blower 26 may be set to always use a higher speed whenever the furnace 24 is activated, if, for example, the furnace 24 burns hot enough that a lower speed could create a fire risk by allowing a furnace 24 heat exchanger to get too hot.

Figure 3:
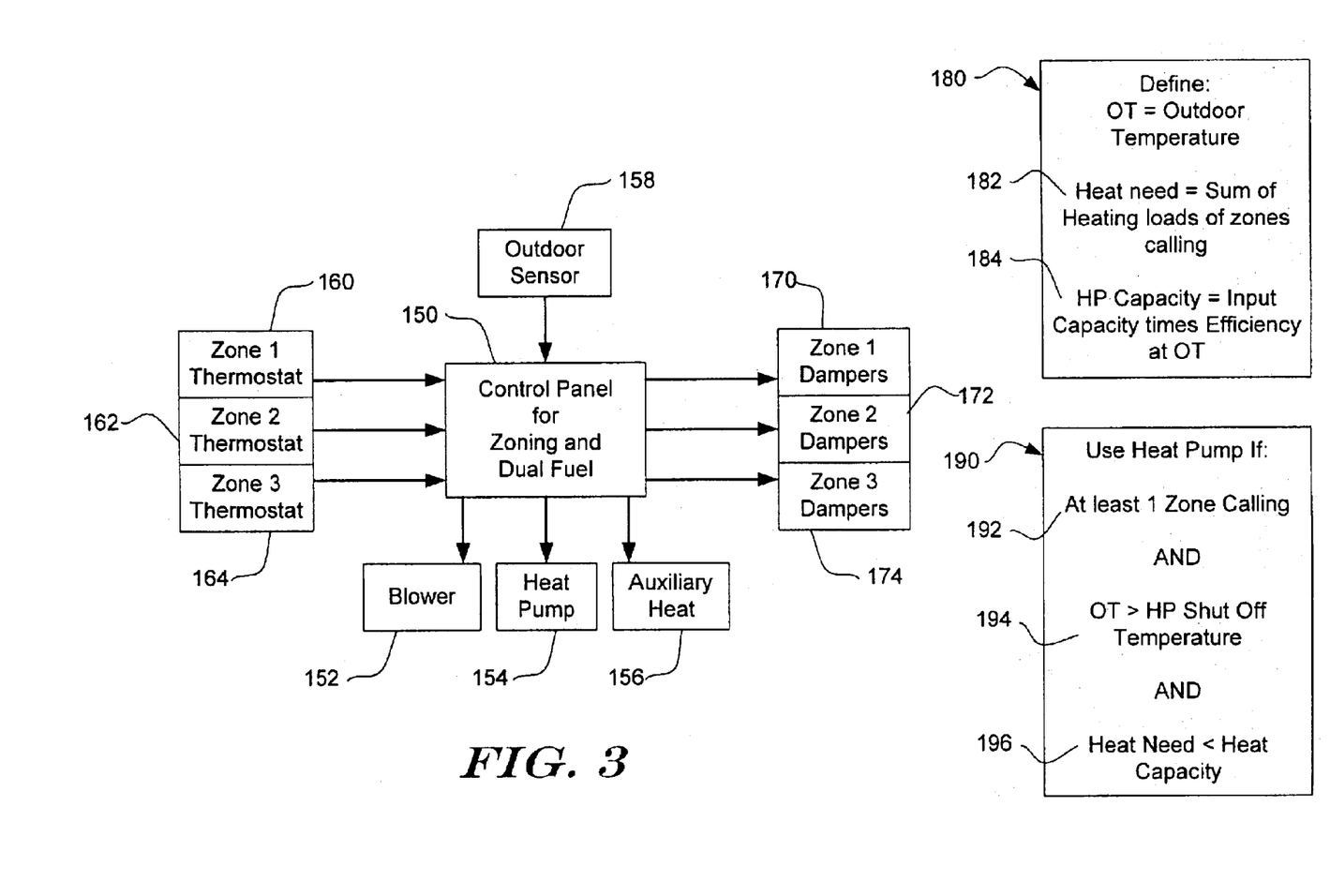
FIG. 3 is a block diagram showing an illustrative controller in accordance with the present invention.

FIG. 3 is a block diagram showing an illustrative controller in accordance with the present invention. A control panel 150 is provided for controlling a blower 152, a heat pump 154 and an auxiliary heat source 156. The blower 152 may be any blower suitable for use in a ventilation system, including, for example, a single or multi-speed blower. The control panel 150 also receives information from an outdoor sensor 158. The outdoor sensor 158 may be a temperature sensor, a humidity sensor, and/or any other type of sensor.

Rather than simply deactivating the heat pump when the outside air temperature reaches a predetermined temperature threshold value, the present invention contemplates continuing to use the heat pump to satisfy heat calls that correspond to less than the entire heated space. As noted above, the heating capacity of a heat pump may tend to degrade as the outside air temperature decreases. However, even at a reduce operating capacity, the heat pump may still have sufficient heating capacity to heat less than the entire space or enclosure. Thus, in a multi-zone system for example, the heat pump source may be efficiently used when less than all of the zones are calling for heat.

In accordance therewith, it is contemplated that the controller of the present invention may be adapted to determine whether the heat pump source is capable of providing sufficient heat to satisfy the expected heating load of the zone(s) that are currently calling for heat. If so, the controller may activate the heat pump source to satisfy the call for heat. If not, the controller may activate an auxiliary heat source, sometimes in combination with the heat pump, to satisfy the call for heat. This may provide a more efficient system.

To help determine whether the heat pump source is capable of providing sufficient heat to satisfy the expected heating load of the zone(s) that are currently calling for heat, reference may be made to information relating to an estimated heating load of each of the zones and information relating to an estimated heating capacity of the heat pump source. The estimated heating load of the zone(s) that are currently calling for heat as well as the estimated heating capacity of the heat pump source may depend on the outdoor air temperature and/or the outdoor air humidity.

In the illustrative embodiment shown in FIG. 3, the control panel 150 may receive information from a zone-1 thermostat 160, a zone-2 thermostat 162, and a zone-3 thermostat 164. The zone thermostats 160, 162, 164 may be of any suitable type for controlling an HVAC system. The zone thermostats 160, 162, 164 may be coupled to the control panel 150 using conventional wiring. The control panel 150 may also control several dampers, including zone-1 dampers 170, zone-2 dampers 172, and zone-3 dampers 174. Each damper 170, 172, 174 may be independently controlled, wherein each controls air flow to one of the three zones. The dampers may be of any suitable type for use in an HVAC system.

The definitions 180, shown toward the right of FIG. 3, include outdoor temperature OT, which, for the illustrative embodiment, may be used in several ways as further described below. The heat need 182 is defined in the illustrative embodiment as the sum of the heating loads of the calling zones. For example, heat need 182 may be determined by initially defining a heat load for each of the three zones. Then, in response to a call for heat from one or more of the thermostats 160, 162, 164, the control panel 150 may determine a heat need by adding the predefined heat loads for the zones. The heat load for each zone may be dependent on the outdoor temperature OT in some embodiments.

In the illustrative embodiment, the heat pump capacity 184 is determined from the input capacity of the heat pump 154 and the efficiency of the heat pump 154. As noted above, the efficiency of the heat pump 154 may be a function of the outside temperature OT, which may be sensed by the outdoor sensor 158. In the illustrative embodiment, the input capacity for the heat pump 154 is fixed by, among other things, the power and pressure ratings of the compressor and the volume of refrigerant used by the heat pump 154. The heat pump capacity 184, therefore, may be largely determined by the outdoor temperature OT and in some cases the outdoor humidity. Thus, in other embodiments, the outdoor sensor 158 may also detect outdoor humidity.

An illustrative decision process is shown at 190. Three steps are used in the illustrative embodiment to conclude that the heat pump 154 should be used. In the first step, at least one of the thermostats 160, 162, 164 must be calling for additional heat 192. If none of the thermostats 160, 162, 164 are calling for heat, no additional heat is needed and therefore the heat pump 154 and the Auxiliary Heat 156 (as well as the blower 152) may be turned off. In the second step, the outdoor temperature OT must be greater than a shut-off 194 temperature of the heat pump 154, which is another use for the outside temperature OT. The shut-off temperature may be a temperature below which the heat pump 154 is too inefficient to be useful, and/or may be a temperature below which operating the heat pump 154 can cause damage to the heat pump 154. If the outdoor temperature OT is too low for using the heat pump 154, then the Auxiliary Heat 156 may be used to satisfy the heat call by the calling zone(s). In the third step, and in the illustrative embodiment 196, the heat need 182 must be less than the heat pump capacity 184. If the heat pump capacity 184 does not exceed the heat need 182, then the heat pump 154 will not be able to fully provide the added heat called for by the calling zone(s). In this case, the Auxiliary Heat 156 may be used to satisfy the heat call. In other embodiments, the heat pump and Auxiliary Heat may be used together to satisfy a heating call, so long as the heat pump is not damaged by the heat produced by the Auxiliary Heat.

Not illustrated in the decision process 190 of FIG. 3 is the decision process for opening and closing the dampers 170, 172, 174. In some embodiments, when no heat is needed, all of the dampers 170, 172, 174 remain open, with the open position being the "default" position. In other embodiments, the dampers 170, 172, 174 may default to a closed position when no heat is needed in order to provide additional privacy between zones. When heat is to be provided, however, the control panel 150 preferably causes the dampers 170, 172, 174 to open and/or close so that the dampers for zones not calling for heat are closed, while dampers for zones calling for heat are opened. This will direct the heated air only to those zones calling for heat.

Figure 4:
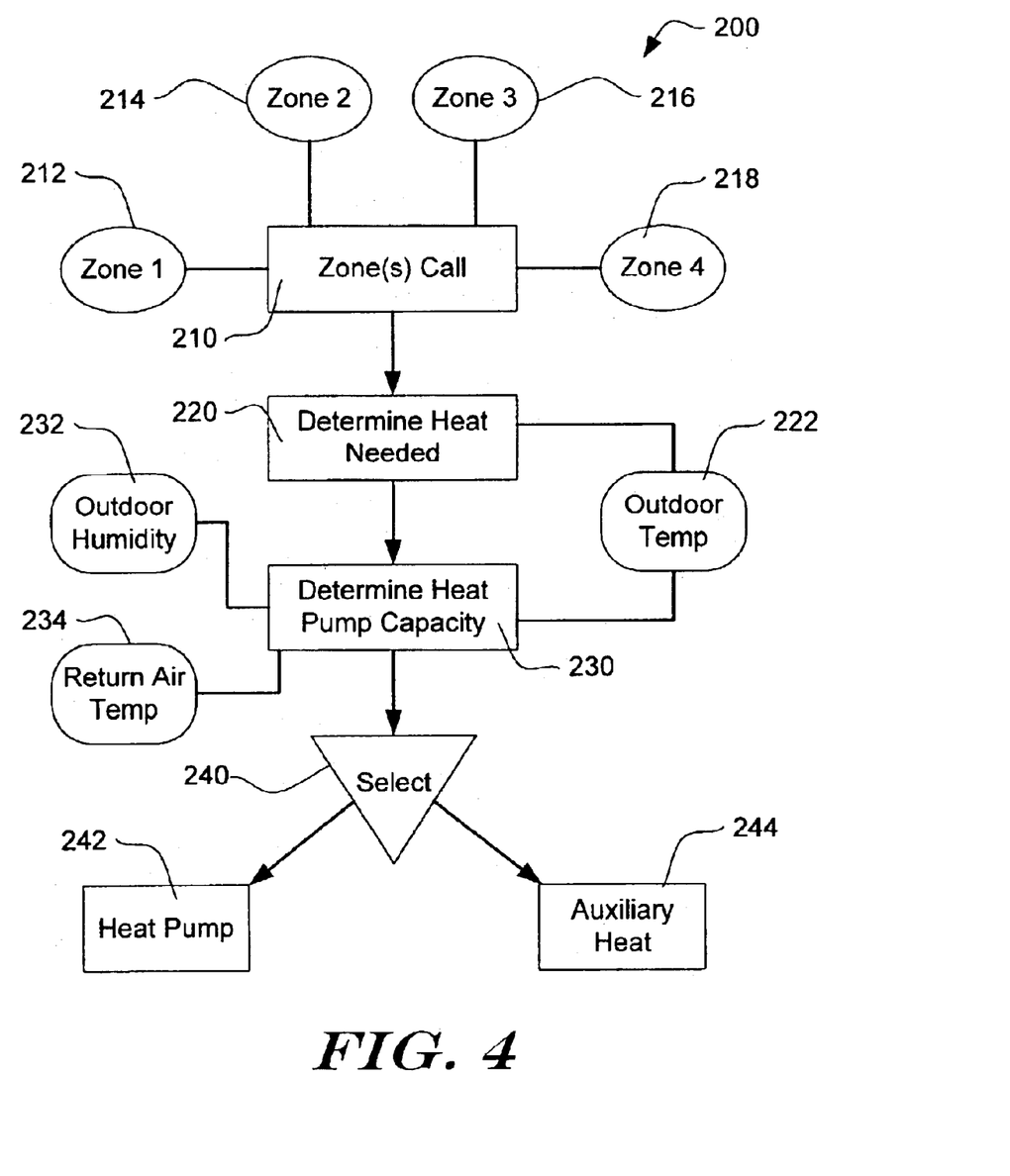
FIG. 4 is a schematic of an illustrative decision tree in accordance with the present invention.

FIG. 4 is a schematic of an illustrative decision tree in accordance with the present invention. In the illustrative embodiment of FIG. 4, the ultimate decision is to select 240 between using a heat pump 242 (or a first stage of a multi-source heat pump) or an auxiliary heat source 244. A first step in the decision tree 200 is to determine which zone(s) are currently calling for heat, as shown at 210. In the illustrative embodiment, any of four zones 212, 214, 216, 218 may initiate a zone call 210.

Next, the heat needed 220 is determined. The heat needed 220 may be determined by taking into account which of the four zones 212, 214, 216, 218 have initiated a zone call 210. In some embodiments, each zone may present a different heat load to the heating system. Also included in determining the heat needed 210 is, optionally, an output from an outdoor temperature sensor 222. As noted above, the outdoor temperature may affect the heat load presented by each of the zones 212, 214, 216, 218.

Once a determination of heat need 220 is made, a determination of heat pump capacity 230 is performed. The heat pump capacity 230 in most embodiments will depend on whether the heat pump can in fact be used, which can be determined by comparing the outdoor temperature 222 to a cutoff temperature. If the outdoor temperature is below the cutoff temperature, the heat pump 242 may not be used.

The outdoor temperature 222 may also be used to estimate a heat pump capacity 230. As the outdoor temperature drops (assuming the heat pump 242 is an air-to-air heat pump), the heat pump capacity 230 also drops. The outdoor temperature 222 may be used to determine the current capacity of the heat pump. In some cases, the current heating capacity of each stage of a multi-stage heat pump may be determined. Also useful in such a determination may be the outdoor humidity 232, which can also contribute to a reduced heat pump capacity 230. For example, when outdoor humidity 232 is too high (particularly at lower temperatures where frost buildup is likely), the heat pump 242 may have to undergo periodic reversing cycles to defrost the exterior heat exchanger. These defrosting cycles may diminish the heat pump capacity by limiting the period that the heat pump 242 may operate. In other embodiments, the heat pump 242 may provide information to the select block 240 to indicate that a defrost cycle is needed, so that the heat pump 242 is not used.

A return air temperature sensor 234 may also be used. The return air temperature sensor 234 may be adapted to indicate whether air in the ventilation system, which is returning to the internal heat exchanger of the heat pump 242, is sufficiently cool to assure safe operation of the heat pump 242. If the return air is too hot, damage to the compressor of the heat pump 242 may occur by causing the pressure inside the heat pump 242 system to exceed safe levels.

Once the heat need 220 and heat pump capacity 230 are determined, the system may select 240 whether to use the heat pump 242 and/or an auxiliary heat source 244. In some embodiments, the auxiliary heat source 244 may include another stage of a multi-stage heat pump. The heat pump 242 may be used if conditions for use are safe (depends on return air temperature 234), if there is sufficient efficiency (depends on outdoor temperature 222 being above cutoff and possibly outdoor humidity 232), and if the heat pump capacity 230 is greater than the heat needed 220. Otherwise, as long as there is a heat call 210, the auxiliary heat 244 may be selected 240. In some embodiments, the heat pump 242 and the auxiliary heat 244 may be simultaneously used to satisfy a heat call, so long as the heat pump can be adequately protected from overheating.

Figure 5:
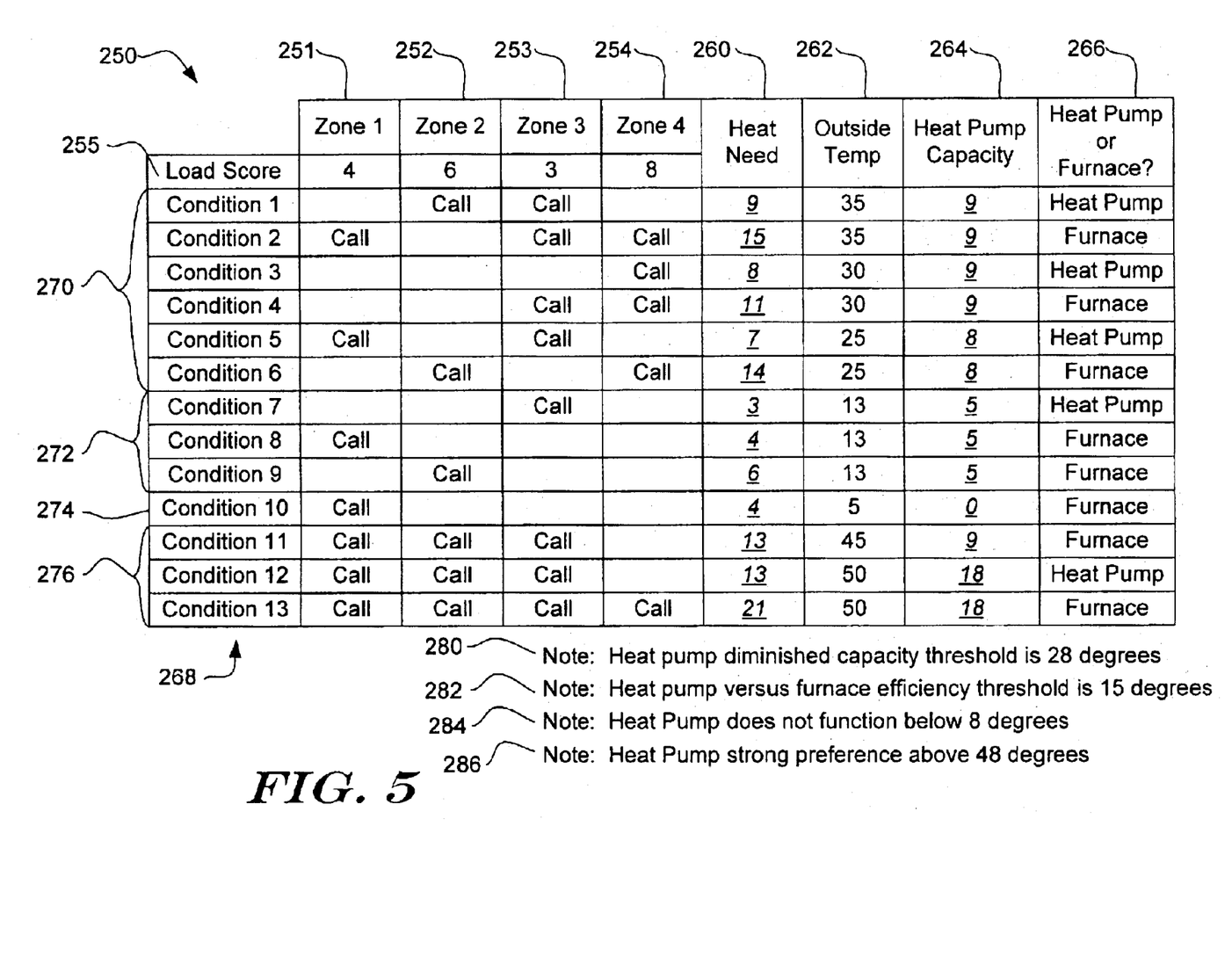
FIG. 5 is a table showing a number of conditions and decisions that may be made in accordance with an illustrative embodiment of the present invention.

FIG. 5 is a table showing a number of conditions and decisions that may be made in accordance with an illustrative embodiment of the present invention. Each illustrative condition is shown in column 268, and the response to each condition is illustrated in the table 250. Table 250 includes several columns for a number of zones 251, 252, 253, 254. Each zone 251, 252, 253, 254 has a load score shown in row 255. The load score 255 may be an estimation of the relative heat need for each zone 251, 252, 253, 254. The load score 255 may be given in terms of an accepted unit, such as BTU or the like, but in the illustrative embodiment of FIG. 5 a simplified load score for each zone is shown.

The load score 255 for each calling zone 251, 252, 253, 254 is added to create a heat need column 260. The outside temperature 262 is monitored to create a sliding scale for the heat pump capacity 264. In some embodiments the load scores 255 may vary with outside temperature 262. A decision of whether the heat pump and/or the furnace will be used may be based on comparing the heat need with the current heat pump capacity of the heat pump. The result of the decision is listed in a results column 266.

Beneath the chart 250 are three notes. The first note 280 indicates that there is a diminished capacity threshold of twenty-eight degrees for the heat pump. This means that the heat pump has a capacity that varies with temperature, and this capacity begins to drop below a threshold at twenty-eight degrees. The second note 282 indicates that the heat pump becomes, as a matter of energy economy, less efficient than the furnace below a temperature of fifteen degrees. In some situations, it will still be acceptable to operate the heat pump at temperatures below this level. For example, if the outdoor temperature drops below the efficiency threshold for only a short time, it may be inconvenient to activate an auxiliary heat source such as a fossil fuel furnace for a short period of time. A third note 284 indicates that the heat pump does not function below a temperature of eight degrees. This may be due to concerns about the heat pump hardware, or may be because a particular heat pump has a low temperature (evaporator) stage that is at about eight degrees, so that no heat would be absorbed in the outside heat exchanger. A fourth note 286 indicates that there may be a preference to use the heat pump when the outside temperature is above a certain threshold (in the illustrative embodiment, forty-eight degrees). Such a preference may be because the heat pump demonstrates a higher efficiency as temperatures rise, or furnace exhaust at warmer outdoor temperatures may be undesirable. Another reason may be knowledge that, when the outdoor temperature is above a certain level, the furnace would only run for a short period of time to provide sufficient heat.

To illustrate the reading of table 250, condition one may be explained as follows. Condition one occurs when two zones, zone two 252 and zone three 253, simultaneously call for heat. The load scores 255 (six for zone two 252 and three for zone three 253) are added and placed in the heat need column 260. The outside temperature is thirty-five degrees, which, as noted below the table 250, is above a diminished capacity temperature of twenty-eight degrees 280. Therefore the heat pump capacity is at its optimum of nine, which is equal to the heat need as shown in the heat need column 260. Therefore, the heat pump is chosen to satisfy the heat call, as indicated in the result column 266.

Condition two is similar except that the heat need is fifteen as indicated in heat need column 260, because zone one 251, zone three 253, and zone four 254 combined present a greater heat load. Because the head need of fifteen exceeds the heat pump capacity of nine, the furnace is used in the illustrative embodiment, as indicated in the result column 266.

The various conditions listed may be split into several categories. In a first category 270, including the first six conditions, the heat pump is operating above the efficiency threshold 282. As noted, the heat pump capacity decreases with decreasing outside temperature, but not to a great degree. The second category 272 includes conditions where the heat pump is below the efficiency threshold. In each case of the second category 272, the outside temperature column 262 indicates an outside temperature of thirteen degrees, which is below the efficiency threshold of fifteen degrees 282. Thus, for conditions in the second category 272, use of the heat pump is not preferred unless use of the furnace would be inconvenient. For example, when only the lowest heat load zone, zone three 253, is calling for heat, the furnace would only be on for a very short period of time, effectively reducing the efficiency of the furnace and possibly reducing the life of moving parts such as dampers and blowers, as well as burners, which may be designed for relatively longer heating duty cycles. Also, when used in relatively short duty cycles, the actual efficiency of many furnaces is lower than the typical operating efficiency of the furnace. Therefore, the heat pump may still be used, as illustrated in condition 7.

Note that the heat pump capacity indicated in the column 264 does still exceed the heat need of three shown in column 260. However, if the heat need is just a bit larger, the cycle for furnace operation is extended, and the furnace is chosen as illustrated by Condition 8. The furnace is chosen in Condition 8 even though the heat pump has sufficient capacity to provide the heat, because the furnace will operate for a long enough period to assure proper function and improved efficiency. However, in some embodiments, the heat pump may still be selected in Condition 8, if desired.

In some embodiments, the distinction between Condition 7 and Condition 8 may also include knowledge of the relationship between the zones. For example, if two zones are close to one another, it may be noted that when one zone calls for heat, the other zone usually calls for heat shortly thereafter. This may occur where one zone is a foyer and the other is an adjacent living room, for example. Thus, an initial call that would not always justify using the furnace may still warrant activation of the furnace since a second call is anticipated.

Another distinction between Condition 7 and Condition 8 can relate to the individual zones. For example, if zone three 253 is a zone that calls for heat very frequently, more frequently than the other zones, then responding each time with the furnace would require repeated starts and stops for the furnace, which is inefficient use of the furnace. Instead, the heat pump may be used to provide the lesser amount of heat needed. Also, for a small heat load zone, the amount of air passing through the ventilation system may be reduced, and it may be undesirable to use the furnace when a very limited amount of air is flowing through the system, since such air will be heated quite dramatically. The very hot air can create problems in the ductwork of a ventilation system by, for example, potentially damaging sealants and/or adhesives used at junctions.

A third category 274 of conditions is when the outside temperature drops too low for the heat pump to function at all. At such temperatures, the furnace is used exclusively, regardless of the zone calling for heat.

A fourth category 276 illustrates a heat pump preference 286. As noted above, when temperatures rise above a certain level (in the illustrative embodiment, forty-eight degrees as noted 286), a strong preference for heat pump use may arise. This may be because the heat pump demonstrates a higher efficiency as temperatures rise, or furnace exhaust at warmer outdoor temperatures may be undesirable. Another reason may be knowledge that, when the outdoor temperature is above a certain level, the furnace would only run for a short period of time to provide sufficient heat. For the illustrative system of FIG. 5, the strong preference is shown in the fourth category 276, and could be, for example, a double-weight preference. For example, instead of analyzing the heat pump capacity (which is nine at the warm temperatures of the fourth category 276) and comparing that number to the heat need, the heat pump may be given an "enhanced" (effectively doubled) heating capacity score. Therefore, the heat need 260 would have to rise above twice the heat pump capacity (in the illustrative embodiment, above eighteen) to activate the furnace.

In the illustrative example, Condition 11 has an outdoor temperature below the preference threshold of forty-eight degrees, so the furnace is used when the heat need column 260 exceeds the heat pump capacity column 264. However, in Condition 12, the temperature is above the preference threshold 286, and so the heat pump capacity is treated as if it is doubled, so the heat need column 260, which is the same as in Condition 11, does not cause the furnace to be selected. Condition 13 is one where the heat need is even larger, and does exceed the enhanced heat pump capacity, so the furnace is selected instead.

Figure 6:
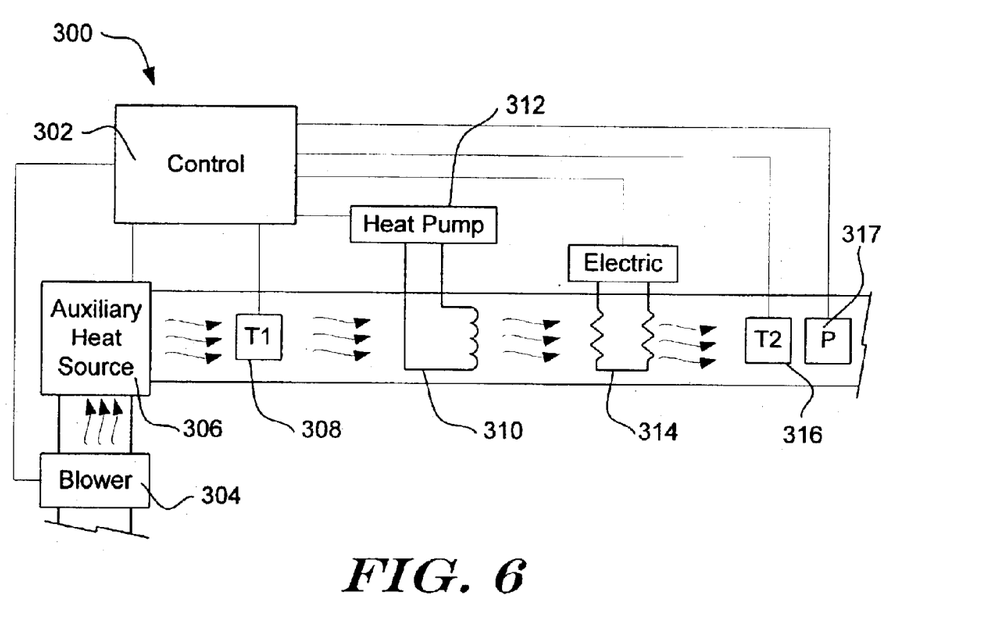
FIG. 6 is a schematic diagram of a multi-source heating system using ventilation system temperature sensors to control source operation.

FIG. 6 is a schematic diagram of a multi-source heating system using ventilation system temperature sensors to control source operation. The system 300 includes several elements within a ventilation system. A control block 302 controls each of the several elements using information gathered from environmental sensors placed in and/or around the space to be heated, as well as additional sensors placed in the ventilation system. A blower 304 provides the mechanism for creating forced air flow through the system 300. An auxiliary heat source 306, which may be a furnace or any other suitable heat source, follows the blower.

A first temperature sensor 308 is placed in the ventilation system after the auxiliary heat source 306 and before a heat pump coil 310. The first temperature sensor 308 may be used to determine whether the air in the ventilation system flow over the heat pump coil 310 is cool enough for safely operating the heat pump 312. If the first temperature sensor 308 senses a temperature that is too high (for some systems, a "high" temperature may be a temperature above about 120 degrees Fahrenheit, though the "high" temperature may vary from heat pump to heat pump), then the control block 302 may disable the heat pump 312. The heat pump 312 would be disabled in order, for example, to protect the compressor of the heat pump 312 from excessive refrigerant pressure.

Following the heat pump coil 310 in the ventilation system is an electric strip heat source 314, which serves in the system 300 as a tertiary heat source. Though shown as a resistive heat coil, the electric strip heat source 314 may be replaced with any other suitable tertiary heat source, including, for example, an inductive electric heat source, a fossil fuel source, or any other suitable heat source as desired. In the system 300, a tertiary heat source is one which can provide additional heat, but which is of lesser capacity than the auxiliary heat source. After the electric strip heat source 314 is a second temperature sensor 316. The second temperature sensor 316 senses the temperature of the air flowing from the currently activated heat sources through the ventilation system. If the second temperature sensor 316 senses a temperature that is not sufficiently high, the control block 302 may change the current heating configuration.

In some cases, it may be desirable to directly measure the heat output of the current configuration of heat sources. To accomplish this, a downstream air temperature sensor may be provided downstream of all of the heat sources. This sensor may be used to determine if the current configuration of heat sources is actually providing sufficiently heated air to satisfy the current call for heat. In some embodiments, a pressure sensor 317 may also be provided to provide a measure of air speed or volume passing through the ventilation system. If the current configuration of heat sources is not providing sufficiently heated air to satisfy the current call for heat, the controller may activate an auxiliary heat source as desired.

For example, if the heat pump 312 is being used to heat a large space, a large volume of air may pass by the heat pump coil 310, and the heat pump 312 alone may not provide sufficient heat to adequately heat the space. The second temperature sensor 316 may sense the inadequate heating, and the control block 302 may use this information to modulate the electric strip heat source 314 or other tertiary source. A pressure sensor 317 may also be provided in some embodiments, to provide a measure of air flow through the ventilation system.

Under some conditions, it may be desirable to adjust the current configuration of heat sources to achieve a desired heating duty cycle. For example, when the control block 302 is programmed to reduce the temperature of a building or parts of a building during certain periods of time (often called a temperature set back period), a shorter heating duty cycle may be desired in order to maximize energy savings. A shorter heating duty cycle often requires an increased heat output from the current configuration of heat sources. In a multi-zone heating system, each zone or group of zones may have the same or different heating duty cycle, as desired, and may be user settable in some cases.

In one example, the control block 302 may determine a heating duty cycle or expected heating duty cycle for selected zone(s) and/or groups of zones when only a first heat source is activated, such as heat pump 310. The control block 302 may then activate only the first heat source when the heating duty cycle or expected heating duty cycle is below a predetermined duty cycle set point, and activate a second heat source (such as electric strip heat 314 or auxiliary heat 306) alone or in combination with the first heat source when the heating duty cycle or expected heating duty cycle is above the predetermined duty cycle set point. In this way, a desired heating duty cycle can be achieved.

In another example, the control block 302 may use data about air exiting the ventilation system to adjust heating strategies. While some other methods and systems predict the heating output of the heat pump 312 and other heat sources, the second temperature sensor 316 may provide a relatively direct measure of actual performance of the heat pump 312. Where the control block 302 contains information related to the performance of the heat pump 312, the output of the second temperature sensor 316 may be used to adjust such performance information over time.

Likewise, both temperature sensors 308 and 316 may be used simultaneously to detect performance of any of the heating elements of the system 300. For example, a change in temperature of air passing by the heat pump coil 310 and the electric strip source 314 may be detected. This change in temperature may be used to provide a measure of the efficiency of each heating source.

As noted in some embodiments above, a heat pump timer may be used in some embodiments to determine whether the heat pump 312 is providing sufficient heat to heat a space. The heat pump timer may operate by predicting that the heat pump 312 should be able to provide adequate heat during a certain period of time. This timer system is not a wholly accurate predictor of actual heat pump performance. For example, a window left open while airing out a room or rooms may prevent the heat pump 312 from warming the space, even though the heat pump 312 is operating properly. The use of one or more temperature sensors 316 and/or 308 may allow for more sophisticated analysis of heat source performance.

Figure 7:
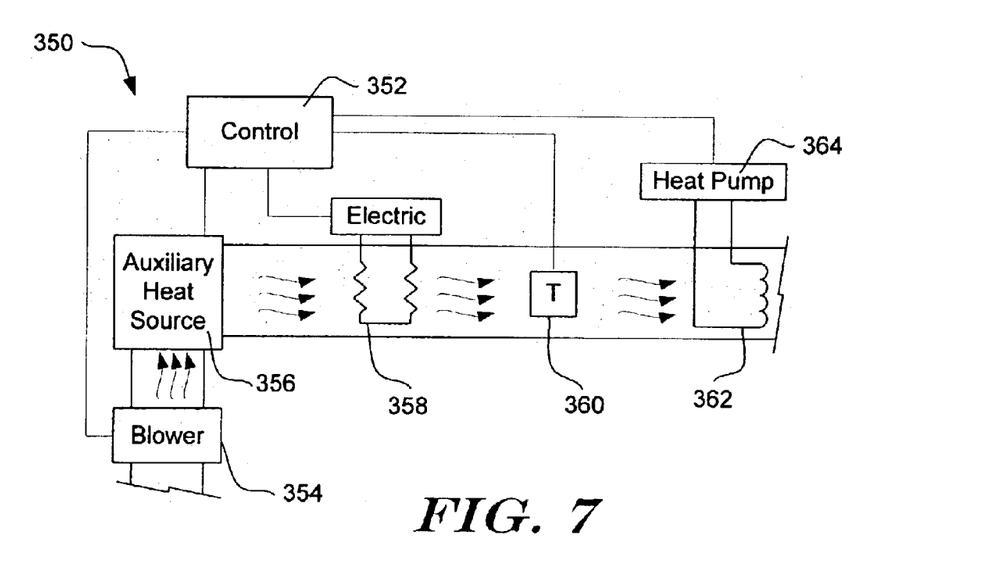
FIG. 7 is a schematic diagram of another multi-source heating system using ventilation system temperature sensors to control source operation.

FIG. 7 is a schematic diagram of another multi-source heating system using ventilation system temperature sensors to control source operation. The system 350 of FIG. 7 includes a control block 352 for controlling the several elements in the system 350 using data gathered from thermostats and other environmental sensors. Included in the system 350 is a blower 354, which forces air to the auxiliary heat source 356, which, again, may be any suitable auxiliary source including, for example, a fossil fuel furnace. After the auxiliary heat source 356 is an electric strip heat source 358 in the illustrative embodiment.

A temperature sensor 360 is placed in the ventilation system after the electric strip heat source 358 and before the heat pump coil 362 of heat pump 364. The temperature sensor 360 can perform several functions in the illustrative embodiment. A first function is that of providing a sensing device to protect the heat pump 364 from overheating. Overly hot air, as noted above, can damage a compressor or other parts of the heat pump 364. Another function for the temperature sensor 360 may be that of modulating the output of the electric strip heat source 358. For example, it may be determined that the air passing by the heat pump coil 362 needs to be at least a certain temperature in order for the overall system 350 to effectively heat a space. The electric strip heat source 358 may be used to pre-heat the air, and the temperature sensor 360 may be used to control the preheat temperature of the air. Hence the control block 352 may modulate the electric strip heat source and/or other tertiary source using readings from the temperature sensor 360.

In another embodiment, the electric strip heat source may be used to provide adequate heating during a reversing/defrost cycle for the heat pump 364, during which the heat pump 364 actually pumps heat out of the system to melt away frost buildup on an external heat exchanger. During such a cycle, not only can the electric strip heat source 358 be used to provide heat for heating an inside space, the electric strip heat source 358 may also help to accelerate the defrosting cycle by providing additional heat to the heat pump coil 362.

While much of the description relates to a multi-source heating system including a heat pump, the methods may be used with other multi-source heating systems that do not use heat pumps. Also, much of the above description relates to forced air or ventilation system. However, some embodiments of the present invention may use other types of heating systems. For example, a ventilation system may be provided for providing heating and/or cooling to a space, where the space also includes electric space heaters or steam/hot water radiators. It is not a requirement of the present invention that a particular mode or type of heating system be used. In another example, a radiator-type system may be provided having a number of radiators spaced throughout a building, where a furnace or boiler may be used some of the time to provide heat, with an additional heat pump source used as well, where an internal heat exchanger for the heat pump source is provided in the fluid flow stream of the steam/hot water system.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A method for heating an enclosure, wherein the enclosure includes a plurality of zones serviced by a ventilation system that is configured to individually control the air supply to each zone, the ventilation system being supplied by a heat pump source and an auxiliary heat source, the method comprising the steps of:

determining if one or more of the zones require additional heat;

if there is at least one zone requiring additional heat:
  determining whether the heat pump source can provide sufficient heat for the one or more zones that require additional heat;
  if the heat pump source can provide sufficient heat, using the heat pump source to individually provide the required additional heat to the one or more zones requiring additional heat; and
  if the heat pump source cannot provide sufficient heat, using the auxiliary heat source to provide at least part of the required additional heat.

2. The method of claim 1 further comprising the steps of:

estimating the heating load for the zones that require additional heat;

estimating the heating capacity of the heat pump source; and comparing the estimated heating load with the estimated heating capacity.

3. The method of claim 2 further comprising the step of sensing the outdoor air temperature, and using the sensed outdoor air temperature to estimate the heating load of each of the zones that require additional heat.

4. The method of claim 2 further comprising the step of sensing the outdoor air temperature and using the sensed outdoor air temperature to estimate the current heating capacity of the heat pump source.

5. The method of claim 2 further comprising the step of sensing the outdoor humidity and using the sensed outdoor humidity to estimate the current heating capacity of the heat pump source.

6. A method for heating an enclosure, wherein the enclosure includes a plurality of zones serviced by a ventilation system that is configured to individually control the air supply to each zone, the ventilation system being supplied by a first heat source and a second heat source, the method comprising the steps of:

identifying which of the zones are calling for additional heat;

determining if the first heat source has adequate heating capacity to provide the additional heat to the calling zones;

providing the additional heat individually to the calling zones with the first heat source if the first heat source has adequate heating capacity; and providing at least some of the additional heat individually to the calling zones with the second heat source if the first heat source does not have adequate heating capacity.

7. The method of claim 6 wherein the determining step includes the steps of:

determining an outside temperature;

determining the heating capacity for the first heat source using the outside temperature;

determining a heat load value for the individual zones that are calling for additional heat using the outside temperature; and comparing the heating capacity of the first heat source to the heat load value.

8. The method of claim 7 wherein the heating load value is related to the amount of heat required to effect a predetermined temperature change in each of the zones calling for additional heat.

9. A method of heating an enclosure, the method comprising:

providing a first heat source;

providing a second heat source;

providing a third heat source;

defining a number of zones for heating;

providing a ventilation system adapted for supplying air to the number of zones;

providing environmental sensors for each zone;

capturing information with the environmental sensors;

determining whether any zones require additional heat; and, if any zones require additional heat;

determining whether the first heat source alone can provide sufficient heat to the zones that require additional heat and, if the first heat source alone can provide sufficient heat, activating only the first heat source to provide the additional heat; and if not, determining whether the first heat source in combination with the second heat source can provide sufficient heat to the zones that require additional heat and, if the first heat source in combination with the second heat source can provide sufficient heat, using the first heat source in combination with the second heat source to provide the additional heat, and if not, using the third heat source alone or in combination with the second heat source and/or first heat source to provide the additional heat to the zones that require additional heat.

10. The method of claim 9 wherein the first heat source is a heat pump.

11. The method of claim 10 wherein the second heat source is a fossil fuel heat source.

12. The method of claim 10 wherein the heat pump includes two or more stages, and the first heat source is a first stage of the heat pump and the second heat source is a second stage of the heat pump.

13. The method of claim 12 wherein the third heat source is a third stage of the heat pump.

14. The method of claim 10 wherein the heat pump includes two or more stages, and the first heat source is a first stage of the heat pump, the second heat source is a second stage of the heat pump, and the third heat source is a fossil fuel heat source.

15. The method of claim 10 wherein the second heat source is an electric strip heat source.

16. The method of claim 15 wherein the third heat source is an electric strip heat source having a higher heating capacity than the second heat source electric strip heat source.

17. The method of claim 15 wherein the third heat source is a fossil fuel heat source.

18. The method of claim 9 wherein the first heat source is provided downstream of the second heat source in the ventilation system, the method further comprising providing a temperature sensor in the air stream of the ventilation system between the second heat source and the first heat source.

19. The method of claim 18 further comprising:

monitoring the output of the temperature sensor; and modulating the second heat source whenever the second heat source is used along with the first heat source in response to the temperature sensor output to protect the first heat source.

20. The method of claim 9 wherein the first heat source is provided upstream of the second heat source in the ventilation system, the method further comprising:

providing a temperature sensor downstream of the second heat source in the ventilation system;

monitoring the output of the temperature sensor to determine if air passing through the ventilation system after the first and second heat sources is sufficiently heated; and modulating the second heat source in response to the output of the temperature sensor.

21. A method of heating a space using multiple heating sources, the method comprising:

providing a first heat source and a second heat source;

determining whether additional heat is needed to warm the space;

predicting an amount of additional heat needed to warm the space;

determining whether the first heat source has sufficient capacity to provide the amount of additional heat;

if the first heat source has sufficient capacity, using the first heat source to warm the space; and if the first heat source does not have sufficient capacity, using the second heat source alone or in combination with the first heat source to warm the space.

22. The method of claim 21 wherein the space includes two or more zones, each zone selectively calling for additional heat, the amount of additional heat needed to warm the space being dependent on which of the zones are currently calling for heat.

23. A method of heating an enclosure having a plurality of heat sources, the method comprising:

receiving a call for heat;

predicting a heat load for the enclosure;

determining which of the plurality of heat sources will meet the predicted heat load; and activating the selected heat sources.

24. The method of claim 23 wherein the predicting step is performed before the activating step.

25. A method for heating an enclosure serviced by a ventilation system, the ventilation system being supplied by a heat pump source and an auxiliary heat source, the method comprising the steps of:

receiving a call for heat;

observing an outdoor condition;

determining the heat pump capacity using the outdoor condition, wherein the heat pump capacity has a first value under a first set of conditions, a second value under a second set of conditions, and a third value under a third set of conditions, the third set of conditions indicating that the heat pump should not be used at all;

predicting a heat load for the enclosure; and comparing the predicted heat load to the predicted heat capacity to determine whether:

to operate the heat pump alone;

to operate the heat pump in conjunction with the auxiliary source; or to not operate the heat pump and use the auxiliary source to provide heat.

26. A method for heating an enclosure, wherein the enclosure includes a plurality of zones serviced by a ventilation system that is configured to individually control the air supply to each zone, the ventilation system being supplied by a heat pump source and an auxiliary heat source, the method comprising the steps of:

receiving a call for heat from one or more zones;

predicting a heat load for the enclosure based on which zones call for heat;

using the predicted heat load to determine which of the heat source, the auxiliary source, or both the heat source and the auxiliary source, can supply the heat load.

* * * * *